(12) United States Patent
Kipke et al.

(10) Patent No.: US 11,009,669 B2
(45) Date of Patent: May 18, 2021

(54) DISTRIBUTION CABLING SYSTEM

(71) Applicant: CORNING RESEARCH & DEVELOPMENT CORPORATION, Corning, NY (US)

(72) Inventors: Cary Alan Kipke, Austin, TX (US); Donald Kent Larson, Cedar Park, TX (US)

(73) Assignee: CORNING RESEARCH & DEVELOPMENT CORPORATION, Corning, NY (US)

( * ) Notice: Subject to any disclaimer, the term of this patent is extended or adjusted under 35 U.S.C. 154(b) by 0 days.

(21) Appl. No.: 16/713,453

(22) Filed: Dec. 13, 2019

(65) Prior Publication Data

US 2020/0116963 A1    Apr. 16, 2020

Related U.S. Application Data

(63) Continuation of application No. PCT/IB2018/053392, filed on May 15, 2018.

(60) Provisional application No. 62/520,151, filed on Jun. 15, 2017.

(51) Int. Cl.
*G02B 6/44* (2006.01)

(52) U.S. Cl.
CPC .......... *G02B 6/443* (2013.01); *G02B 6/4463* (2013.01)

(58) Field of Classification Search
CPC .................................................. G02B 6/4463
See application file for complete search history.

(56) References Cited

U.S. PATENT DOCUMENTS

| 2,913,260 | A | * | 11/1959 | Givens | F16L 5/027 285/151.1 |
| 4,379,204 | A | * | 4/1983 | Perrault | H02G 3/22 174/653 |
| 4,731,505 | A | * | 3/1988 | Crenshaw | G02B 6/443 138/110 |
| 4,781,433 | A | * | 11/1988 | Arroyo | G02B 6/4403 264/1.28 |
| 4,893,893 | A | * | 1/1990 | Claxton | G02B 6/3807 385/108 |
| 5,109,456 | A | * | 4/1992 | Sano | G02B 6/443 385/100 |
| 5,138,684 | A | | 8/1992 | Bullock et al. | |

(Continued)

FOREIGN PATENT DOCUMENTS

| EP | 0526556 A1 | 2/1993 |
| JP | 2000009977 A | 1/2000 |
| WO | 91/17551 A1 | 11/1991 |

OTHER PUBLICATIONS

International Search Report and Written Opinion of the International Searching Authority; PCT/ID2018/053392; dated Aug. 13, 2018; 13 Pages; European Patent Office.

*Primary Examiner* — Sung H Pak
(74) *Attorney, Agent, or Firm* — William D. Doyle (57) ABSTRACT

A signal transmission cable is described that comprises at least one signal conductor centrally disposed in the cable and a plurality of concentric layers disposed around the at least one signal conductor, wherein the plurality of concentric layers comprises at least one non-porous layer and a porous exterior layer surrounding the at least one non-porous layer. The signal transmission cable is characterized as having a characteristic diameter that can be reduced upon application of an external force.

20 Claims, 8 Drawing Sheets

(56) References Cited

U.S. PATENT DOCUMENTS

| | | | |
|---|---|---|---|
| 5,333,229 A | 7/1994 | Sayegh | |
| 5,560,986 A | 10/1996 | Mortimer, Jr. | |
| 5,934,338 A * | 8/1999 | Perstnev | F16L 59/022 138/148 |
| 6,178,277 B1 * | 1/2001 | Ravela | B29C 55/24 385/109 |
| 6,398,190 B1 * | 6/2002 | Li | G02B 6/4459 254/134.3 FT |
| 6,487,345 B1 * | 11/2002 | Dixon | G02B 6/443 385/100 |
| 6,766,090 B2 * | 7/2004 | Brown | G02B 6/4485 385/128 |
| 6,821,638 B2 * | 11/2004 | Obeshaw | B21C 37/15 138/148 |
| 7,351,009 B2 | 4/2008 | Serrano et al. | |
| 2009/0279833 A1 * | 11/2009 | Overton | G02B 6/4494 385/111 |
| 2017/0352451 A1 * | 12/2017 | Campbell | H01B 9/028 |

* cited by examiner

DISTRIBUTION CABLING SYSTEM

PRIORITY APPLICATIONS

This application is a continuation of International Application No. PCT/IB2018/053392, filed May 15, 2018, which claims the benefit of priority of U.S. Provisional Application No. 62/520,151 filed on Jun. 15, 2017, the content of each of which is relied upon and incorporated herein by reference in their entirety.

BACKGROUND

Field of the Invention

The present invention is directed to a distribution cabling system, optical fiber cable and optical fiber cabling installation method. In particular, the optical fiber cable includes a conformable layer that permits installation of the exemplary cable against surfaces that have minor flaws or surface irregularities without risking degradation of the signal being transmitted through said cable.

BACKGROUND OF THE INVENTION

Communications service providers are faced with increasing demands to deliver faster and better service to their customers. Service providers can meet these needs for greater bandwidth by incorporating fiber optics in the access network, the communication connection to the end subscriber. Service providers have announced gigabit service offerings.

With many players competing in the industry, speed to build new networks is critical. However, the process to deploy traditional fiber optic networks often requires time consuming civil engineering work both in planning, verifying existing infrastructure location and construction. The access network can be the most burdensome in that individual fibers must connect each subscriber's living unit. In the case of single family home neighborhoods, that means a single fiber to each home.

For aerial deployments (telephone poles), deploying the fiber optic cable is relatively straight forward. Lashing the new fiber optic distribution cable to existing telephone cabling or stringing a new messenger wire in which to lash the new fiber optic cable is done relatively quickly. However, for new entrants for fiber-to-the-home (FTTH) service, gaining access to the telephone poles from the pole owner (often incumbent telephone company) can be a time consuming and litigious process and some neighborhoods either do not have telephone poles or do not permit the use of the poles for new services.

For below grade deployments (conduit below grade in which to pull the distribution cable) deployment can involve many construction machines and operators for weeks for a serving area of 200-500 homes. One of the most time-consuming operations is directional drilling to place the conduit below grade. The cost of directional drilling is approximately $40/foot making below grade fiber access network deployment cost much more than aerial deployments. Micro-trenching can be used to install telecommunication cables, including fiber optic cables, electrical cables or pipes below ground at a significantly lower cost and with a relatively low-impact to the surrounding areas when compared to directional drilling or other conventional trenching methods. Micro-trenching involves cutting a small, relatively shallow trench that is about 12 inches deep in the ground, cement, asphalt, earth, etc. Once created, one or more conduits are placed in the micro-trench and one or more cables or pipes are pulled or fed through the conduit. In some instances, a low viscosity, reactive sealant material, slurry or grout can be used to backfill the trench over the conduit. In other installations, the cables or pipes can be laid directly into the micro-trench prior to backfilling the trench. The backfill material can be a flowable non-shrinking concrete, polymer resin such as a polyurea or epoxy filler) or a grout. Some conventional fillers can shrink, suffer UV degradation or damage due to weathering causing spalling or fracture of the backfill material which can leave the conduit(s) and/or the cables housed in the micro-trench unprotected and susceptible to damage. Additionally, polymer resin fillers can be quite costly and may have unsuitable cure dynamics.

Therefore, a need exists for a distribution cabling alternative to traditional aerial and below grade installations that can eliminate the need to share telephone poles and avoid the time consuming and costly directional drilling for conduit placement while at the same time avoiding the issues associated with conventional micro-trenching methods.

SUMMARY

In one embodiment of the present invention, a signal transmission cable that comprises at least one signal conductor centrally disposed in the cable and a plurality of concentric layers disposed around the at least one signal conductor, wherein the plurality of concentric layers comprises at least one non-porous layer and a porous exterior layer surrounding the at least one non-porous layer. The signal transmission cable is characterized as having a characteristic diameter that can be reduced upon application of an external force.

The above summary of the present invention is not intended to describe each illustrated embodiment or every implementation of the present invention. The figures and the detailed description that follows more particularly exemplify these embodiments.

BRIEF DESCRIPTION OF THE DRAWINGS

The present invention will be further described with reference to the accompanying drawings, wherein.

While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the scope of the invention as defined by the appended claims.

DETAILED DESCRIPTION

In the following Detailed Description, reference is made to the accompanying drawings, which form a part hereof, and in which is shown by way of illustration specific embodiments in which the invention may be practiced. In this regard, directional terminology, such as "top," "bottom," "front," "back," "leading," "forward," "trailing," etc., is used with reference to the orientation of the Figure(s) being described. Because components of embodiments of the present invention can be positioned in a number of different orientations, the directional terminology is used for purposes of illustration and is in no way limiting. It is to be understood that other embodiments may be utilized and structural or logical changes may be made without departing from the scope of the present invention.

In a first embodiment, a signal transmission cable that has a conformable surface is described. The conformability of the exemplary cable means that the exemplary cable can be disposed against a surface having minor flaws or surface irregularities without risking degradation of the signal being transmitted through the cable. The conformable surface also allows for the cable to pass through gaps or channels that are smaller than the characteristic diameter of the fiber as well as providing positional support of the cable within the slot or channel. The exemplary cable can aid in "centering" the exemplary cable in a shallow groove or channel. In an exemplary aspect, the shallow channel can be less than 2 inches deep, preferably less than 1 inch deep. In one aspect, the conformable surface aids in maintaining the proper position within the channel while backfilling the channel with a sealant or adhesive.

In one aspect, the exemplary cable can be installed in a channel near the surface of a roadway in a residential neighborhood for delivery of Fiber to the Home (FTTH) service. The cable can be quickly installed in a shallow groove using a compact micro-grooving machine rather than having to rely on expensive and disruptive directional drilling processes.

Figure 1A:
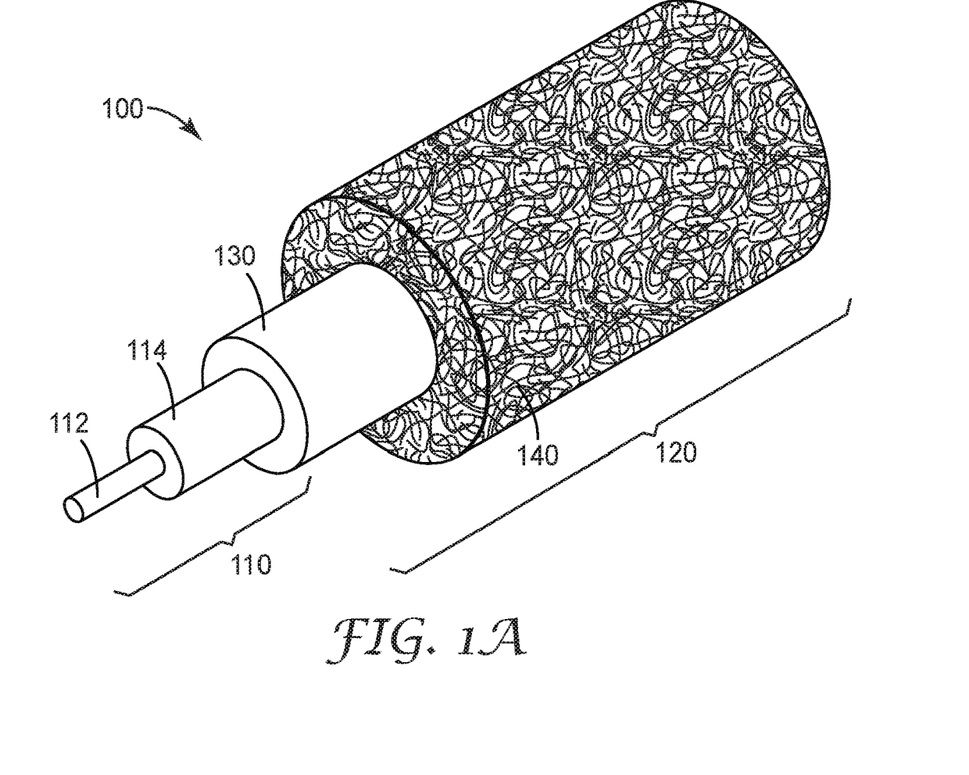
FIGS. 1A and 1B are a schematic isometric view and a schematic cross-sectional view of an exemplary signal transmission cable according to the current invention.
Figure 1B:
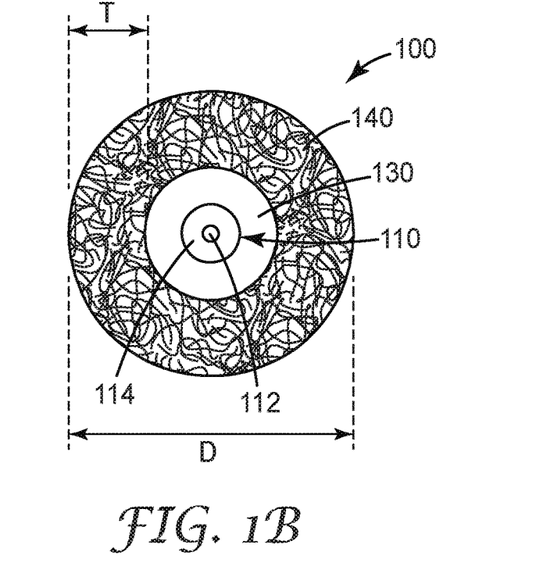

FIGS. 1A and 1B show an exemplary signal transmission cable 100, which can be compressed to fit in channels or clips that have a width that is less than the characteristic diameter of the cable. Signal transmission cable 100 includes at least one signal conductor 110 centrally disposed in the cable and a plurality of concentric layers 120 disposed around the at least one signal conductor. The plurality of concentric layers comprises at least one non-porous layer 130 and a porous exterior layer 140 surrounding the at least one non-porous layer. Transmission cable 100 has a characteristic diameter, D as shown in FIG. 1B.

Signal conductor 110 can transmit either an optical or an electrical signal. In an exemplary aspect, the signal conductor can be an optical fiber having either an optical transmitting polymer or glass waveguide 112 and a protective buffer coating 114 that surrounds the polymer or glass waveguide. The optical fiber can be a single mode optical fiber or a multimode optical fiber. The optical fiber can be a conventional optical fiber having a conventional acrylate coating having a diameter of approximately 250 microns. The optical fiber is generally a standard optical fiber with a glass waveguide having a diameter of approximately 125 microns, and an acrylate coating surrounding the glass, the acrylate coating having a thickness of approximately 62.5 microns, such that the diameter of the entire "optical fiber" is 250 microns.

In some aspects, the signal conductor can be a conventional ribbon fiber (not shown) having multiple fibers or a series of parallel optical fibers disposed on a filament tape to allow straightforward access to separate individual fibers by peeling off a portion of the filament tape. In an alternative aspect, the signal conductor can be an electrical line such as a coated copper wire, micro coax cable, etc.

The at least one non-porous layer 130 comprises a polymeric sleeve or jacket that is positioned around the signal conductor 110 (i.e. the optical fiber). The at least non-porous layer in may be capable of being removed by using a tool, or in another embodiment, may be peeled by hand. In some embodiments, the at least one non-porous layer 130 may be formed from a polymer material, such as polyethylene. Other materials may also be suitable materials for the primary non-porous layer, such as polypropylene, polyvinyl chloride (PVC), TPE, neoprene, polyurethane or fluoropolymers such as FEP and PFA. The at least one non-porous layer may, in one preferred embodiment, be both durable and weatherable. As such, one particularly appropriate material for non-porous layer 130 may be UV stabilized polyethylene material. In some embodiments, the non-porous layer 130 may also be abrasion resistant.

The exemplary cable 100 can further at least one strength element (not shown) disposed between the at least one signal conductor and the at least one non-porous layer. The at least one strength element can be strength elements commonly encountered in optical fiber cables, such as an aramid floss, an aramid yarn, a metal wire, a glass reinforced polymer rod, or an aramid fiber reinforce rod.

Figure 2A:
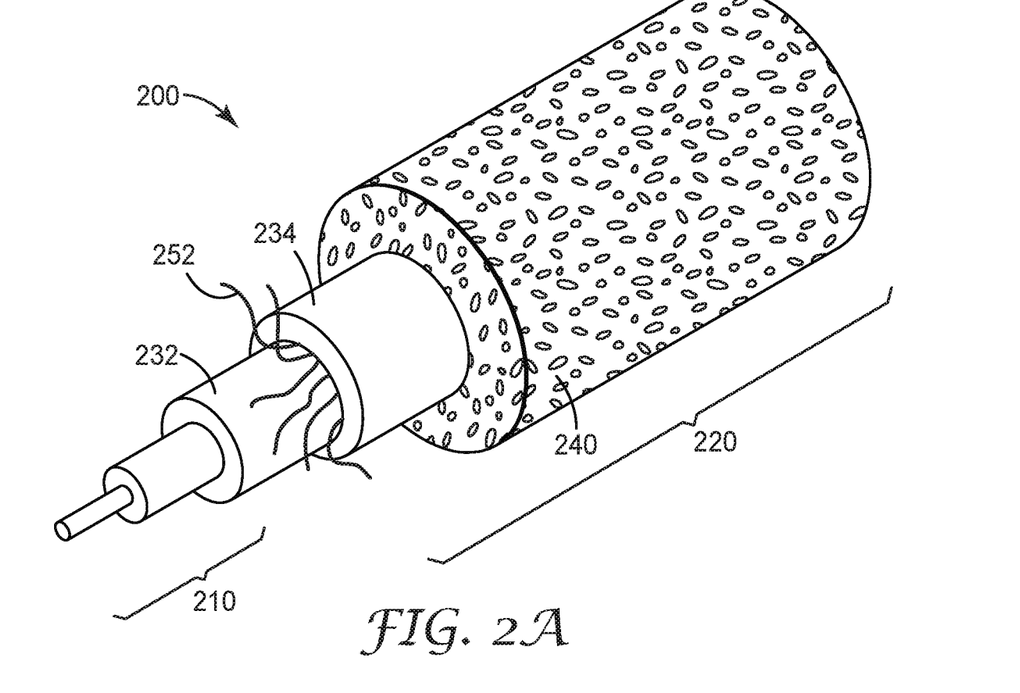
FIGS. 2A and 2B are a schematic isometric view and a schematic cross-sectional view of another exemplary signal transmission cable according to the current invention.
Figure 2B:
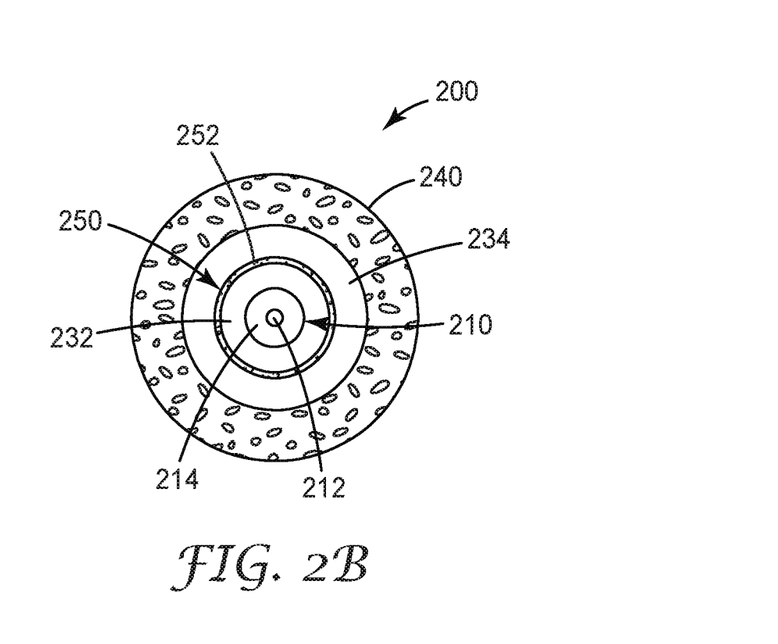

In one embodiment, the least one nonporous layer of exemplary cable 200 has a plurality of concentric layers 220 disposed around the at least one signal conductor 210 as shown in FIGS. 2A and 2B. The plurality of concentric layers comprises a first nonporous layer 232 surrounding the at least one signal conductor 210 and a second nonporous layer 234 surrounding the first nonporous layer and a porous exterior layer 240 surrounding the second non-porous layer. In one aspect, the first nonporous layer can be a buffer tube. At least one strength element can be disposed between the first nonporous layer and the second nonporous jacket layer and in an exemplary aspect, the at least one strength element can be a strength imparting layer 250 of an aramid floss 252.

The porous exterior layer 140 is resiliently compressible allowing the cable to be inserted into spaces that are smaller than the characteristic diameter of the cable. In some embodiments, the porous exterior layer can have a generally open pore structure. The porous layer can be characterized by its basis weight. In an exemplary aspect, exemplary materials usable in the porous layer will have a basis weight between 100 g/m2 and about 1000 g/m2. In one exemplary aspect, the porous exterior layer can comprise a nonwoven material. In an alternative aspect, the porous exterior layer can comprise an open cell foam layer or a closed cell foam layer. In yet another alternative aspect, the porous exterior layer can comprise a woven fabric layer.

Figure 3A:
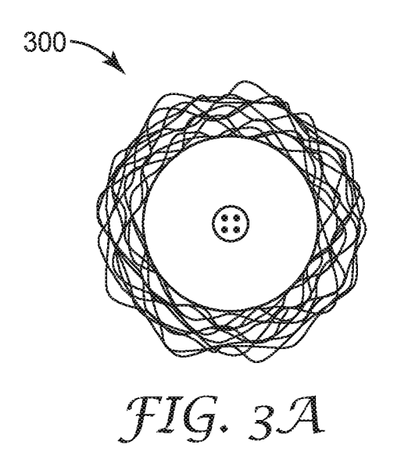
FIGS. 3A-3D are schematic cross-sectional views of four additional exemplary signal transmission cables according to the current invention.
Figure 3B:
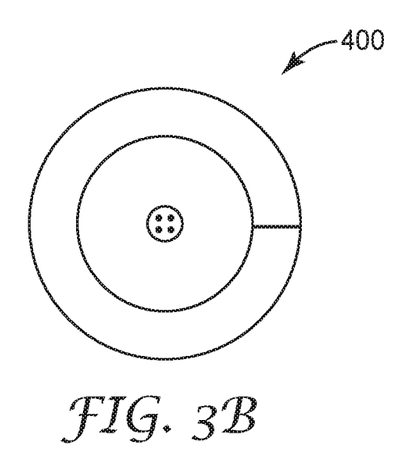
Figure 3C:
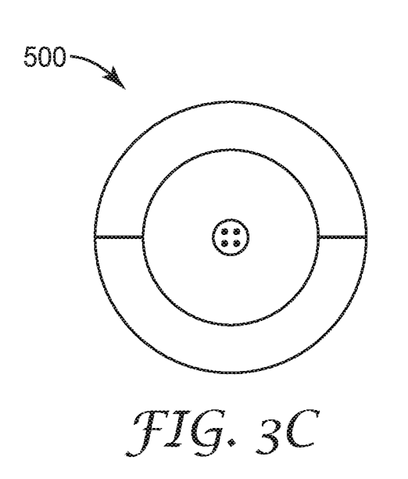

The porous layer can be formed directly on the outer surface of the at least one nonporous layer or a precursor can be formed that comprises the transmission media and the at least one nonporous layer and the porous external layer can be adhesively applied to the surface. When the porous layer is formed directly on the outer surface of the at least one nonporous layer, there is no visible seam extending through the porous layer as shown in the transmission cable 300 shown in FIG. 3A. Alternatively, a flat web of the porous material can be coated with adhesive and wrapped around the precursor cable via a cigarette wrapping technique to yield the transmission cable 400 having the cross-section shown in FIG. 3B. In another aspect, the exemplary transmission cable can be formed by helically wrapping an adhesive-coated flat web of the porous material around the precursor cable. In another aspect, the exemplary transmission cable 500 can be formed by wrapping a pair of adhesive-coated flat webs of the porous material around the precursor cable to yield the exemplary cross-section shown in FIG. 3C. Finally, an adhesive coated precursor cable can be installed into a thicker piece of porous material through a slit to yield transmission cable 600 shown in FIG. 3D. An adhesive can be used to seal the slit in the porous layer of transmission cable 600.

Figure 3D:
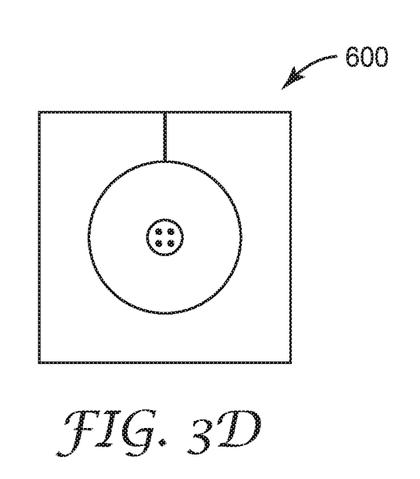

The precursor cable or the at least one nonporous layer surrounding the signal conductors can be formed to have a circular cross section, an oval cross section, a figure-8 cross section, rectangular cross section or any other cross section that is commonly employed in the production of transmission cables. In general, the shape of the cross-section of the porous layer will be similar to the cross-section of the precursor cable or the at least one nonporous layer surrounding the signal conductors. However, the porous layer and the precursor cable or the at least one nonporous layer surrounding the signal conductors can also have different cross-sectional shapes as shown in FIG. 3D.

Exemplary nonwoven materials can be formed from polyethylene, polypropylene, nylon, etc. via a nonwoven extrusion process or by the using staple fibers that can be bound mechanically or thermally. By choosing specific types of fibers, nonwoven fabrics can be designed to have certain properties such as flame retardant, waterproof, or highly absorbent. In addition to fiber types, existing fibers can be coated with chemicals to enhance its intended properties.

An exemplary nonwoven material that can be used as the exterior porous layer can be a material that is similar to the nonwoven material used in Scotch Brite Cleansing Pad available from 3M Company (S. Paul, Minn.). In an exemplary aspect, nonwoven materials can have a basis weight from about 100 g/m2 to about 1000 g/m2. In some embodiments, the nonwoven materials may include bound particles which have a hardness that is greater than the hardness of the fibrous portion of the nonwoven material. In an exemplary aspect, the bound particles can be abrasive particles such as, for example, silicon carbide, quartz, aluminum oxide, etc.

Exemplary open or closed cell foam materials can be polyurethane foams, urea foams, polyisocyanurate foams, polyethylene foams, or urea formaldehyde foams, which can be extruded directly onto the outer surface of the at least one nonporous layer or which can be adhesively applied. Open cell foams may be desirable due to their low exothermic reaction temperatures which will not harm the underlying nonporous layer during fabrication of the exemplary cable.

Porous exterior layer 140 is characterized by a porous layer thickness, T. The compressibility of the porous layer means that characteristic diameter, D, of the cable can be reduced by the application of an external force. In some embodiments, the characteristic diameter of the cable can be reduced by up to about 25% or by up to 90% of two times the porous layer thickness. The reduction in size of the cable can occur in one dimension such as may occur when the external force is applied on opposite sides of the cable or the reduction can be a circumferential reduction reducing the total circumference of the cable.

Figure 4A:
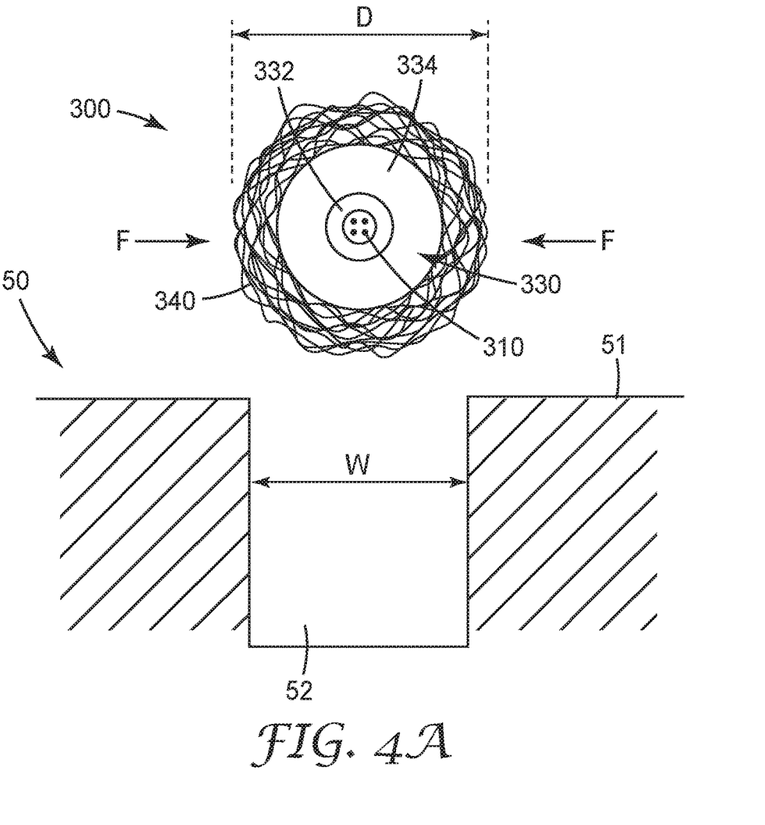
FIGS. 4A-4D illustrate an exemplary use of the signal transmission cables according to the current invention.

Porous exterior layer 140 is also resilient, so that when the external force is released, the porous exterior layer will try to return to its original dimensions. If the cable is disposed in a space (e.g. a channel, notch or clip) that is smaller than the characteristic diameter of cable, the compressed porous exterior layer will expand the confines or space in which the cable is disposed. For example, as shown in FIG. 4A, if the cable is disposed in a channel 52 having a width, W, that is less than the characteristic diameter of the cable, the porous exterior layer 340 will be compressed between the walls 53 of the channel and the surface of the outermost nonporous layer 330. As a result, porous exterior layer 340 will exert a holding or positioning force against the wall of the channel to hold the cable at a desired position within said channel. In an exemplary aspect, the bound particles present in the porous layer of some cable embodiments can add a frictional retention element to the holding force.

As mentioned previously, the exemplary cables of the present disclosure can be used in confined spaces such as delivery of Fiber to the Home (FTTH) service to an end user. In one application, the exemplary cables can be installed near the surface of a roadway in a shallow groove or channel. FIGS. 4A-4D illustrate the installation of an exemplary transmission cable 300 into a narrow groove or channel 52. Transmission cable 300 comprises has a plurality of concentric layers disposed around four signal conductors 310. The plurality of concentric layers comprises a nonporous layer 330 surrounding the signal and a porous exterior layer 340 surrounding the second non-porous layer.

Depending on the installation location of the cable, a narrow channel or groove can be formed by molding, digging or cutting the channel or groove into the surface of the installation location. For example, to provide FTTH service or a service drop to an end user, the installation location 50 can be in a roadway, in which case micro trenching or saw cutting can be used to form a shallow channel 52 in the surface 51 of the roadway. Preferentially, the dimensions of the channel (i.e. the width and depth) are kept as small as possible to minimize time, disruption, debris and expense. When working with the exemplary transmission cables of the present disclosure the width, W, of the channel can be less than the characteristic diameter of the cable.

Figure 4B:
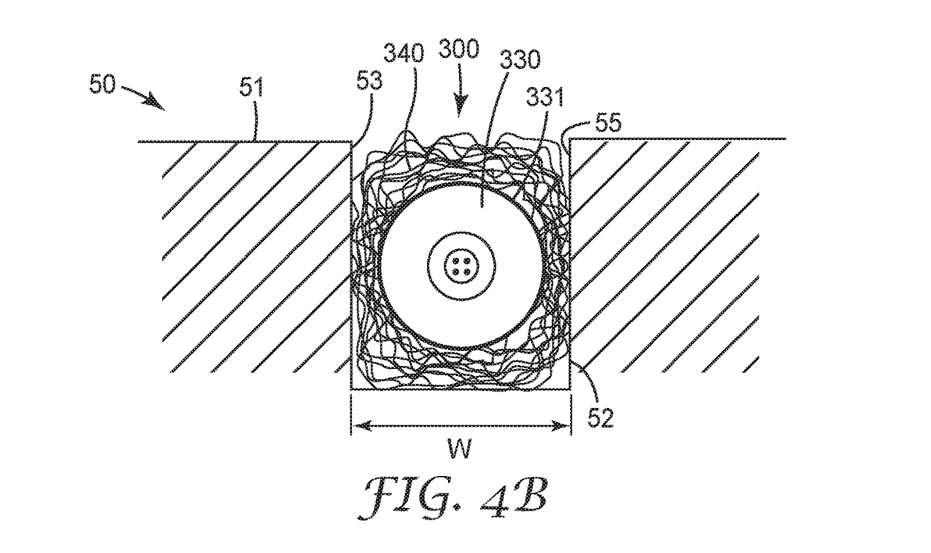

To install the cable in a narrow channel, an external pressure or force, F, is applied to an external surface of the transmission cable 300, as shown in FIG. 4A, to compress the porous exterior layer 340 until the reduced characteristic diameter is less than the width of the channel. The cable can then be inserted into channel 52 and the pressure on the external surface of the porous external surface can be released as shown in FIG. 4B. The porous exterior layer will expand back to the confines or space in which the cable is disposed. For example, if the cable is disposed in a channel 52 having a width, W, that is less than the characteristic diameter of the cable, the porous exterior layer 340 will be compressed between the walls 53, 55 of the channel and the surface 331 of the outermost nonporous layer 330. As a result, porous exterior layer 340 will exert a positioning force against the wall of the channel to hold the cable at a desired position within said channel.

Figure 4C:
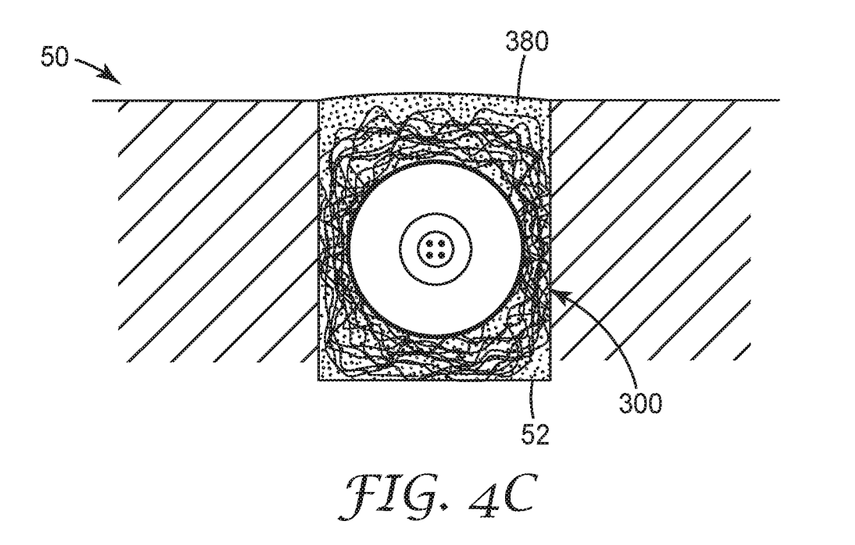

In some installations, such as those where the exemplary cable will be installed outside, an optional sealant material 380 can be dispensed into the channel. Exemplary sealants should be capable of flowing or diffusing through the porous exterior layer around the cable to completely fill the channel as shown in FIG. 4C. In an alternative embodiment, the sealant material penetrates in to a portion of the porous layer such as a portion close to the surface of the porous layer to create a skin layer. The exemplary sealant material should have a viscosity less than 20,000 cps, preferably less than 10,000 cps, more preferably less than 1000 cps. Exemplary sealant materials can be selected from polyurethane-based sealants, epoxy-based sealants, or polyester based sealants. In an exemplary aspect, tailings from the forming of the channel can be mixed into the sealant material before dispensing the sealant material into the channel. In some aspects, a moisture curable sealant material is advantageous because the cure can be initiated from the residual moisture remaining from the forming of the channel into which the cable will be disposed or by the residual moisture in the tailings that are added to the sealant material. In addition, the use of a moisture curable sealant eliminates the need to dry the channel prior to backfilling with the sealant material.

Exemplary sealant materials include 3M Detector Loop Sealant 500 (polyurethane) and Bondo P-606 Flexible Traffic Detector Wire Loop Sealant (polyester), each of which is available from 3M Company (St. Paul Minn.).

Figure 4D:
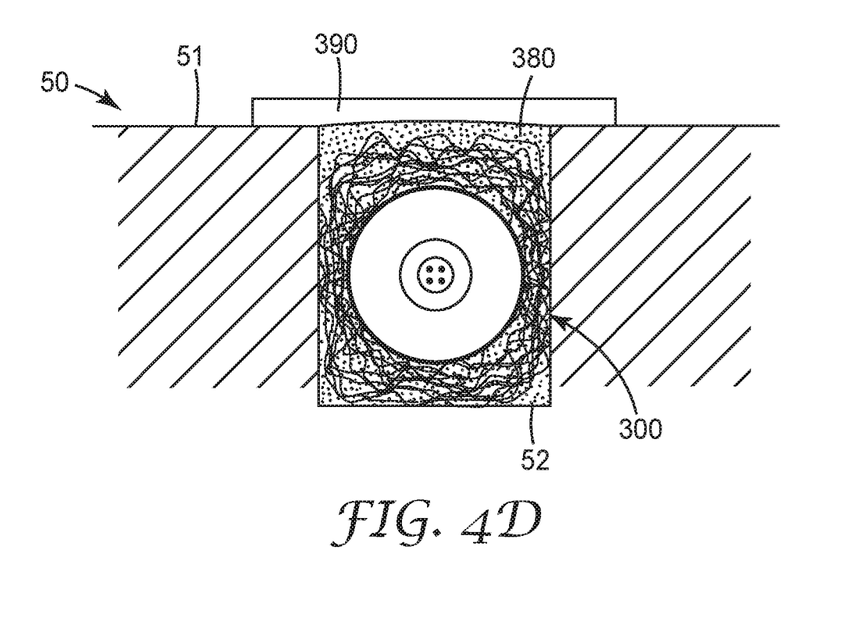

An optional protective cover 390 can be applied over the channel to further protect the exemplary cable installed therein as shown in FIG. 4D.

Figure 5:
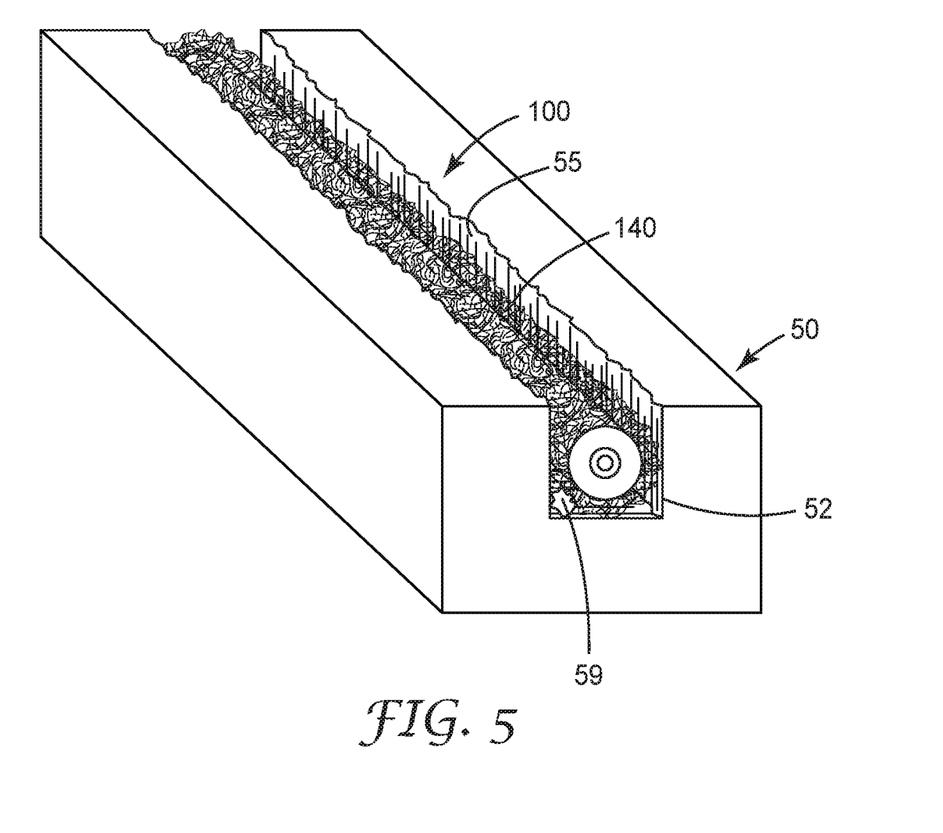
FIG. 5 is a schematic representation of an exemplary signal transmission cable in a channel according to the current invention.

The exemplary cable, described in the present disclosure, can be used in channels which have one or more defects, have a critical dimension that is less than the diameter of said cable or which have rough debris or residue within said channel. In general, micro bending from contact with debris or residue can induce loss in the signal being transmitted through the cable. However, porous layer 140 of the exemplary cables, such as cable 100 shown in FIG. 5, aids in isolating the active portion (e.g. the signal conductor and the at least one nonporous layers) from defects such as rough texturing or irregularities in the side walls 55 of channel 52 which can be due to the formation of said channel or from protruding aggregate residue or debris 59.

Figure 6A:
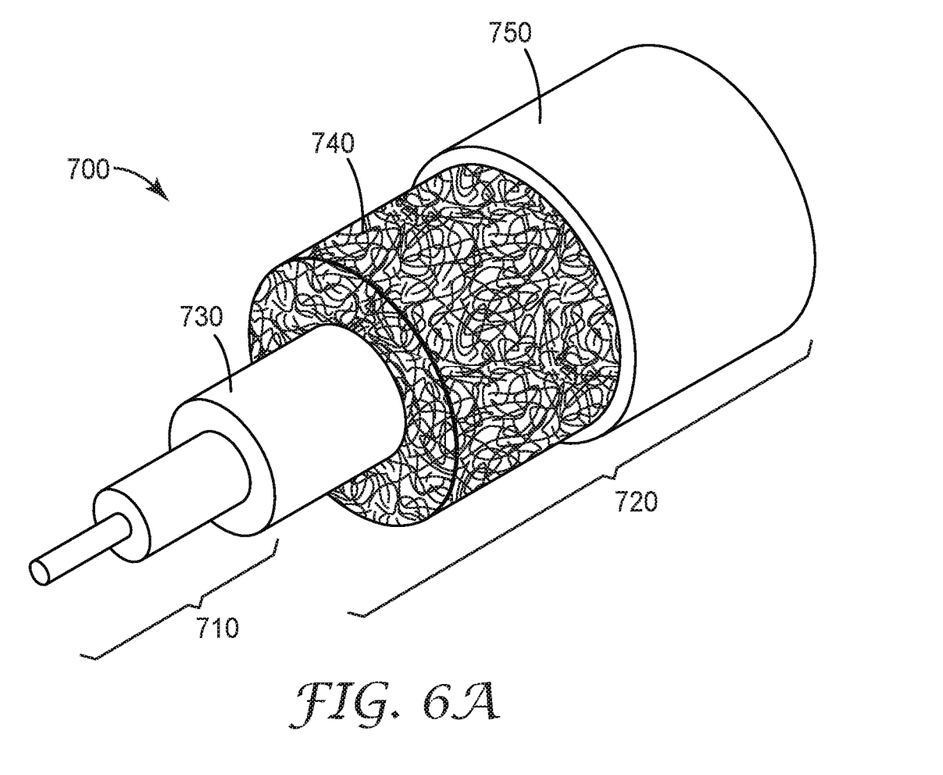
FIGS. 6A and 6B are a schematic isometric view and a schematic cross-sectional view of another exemplary signal transmission cable according to the current invention.
Figure 6B:
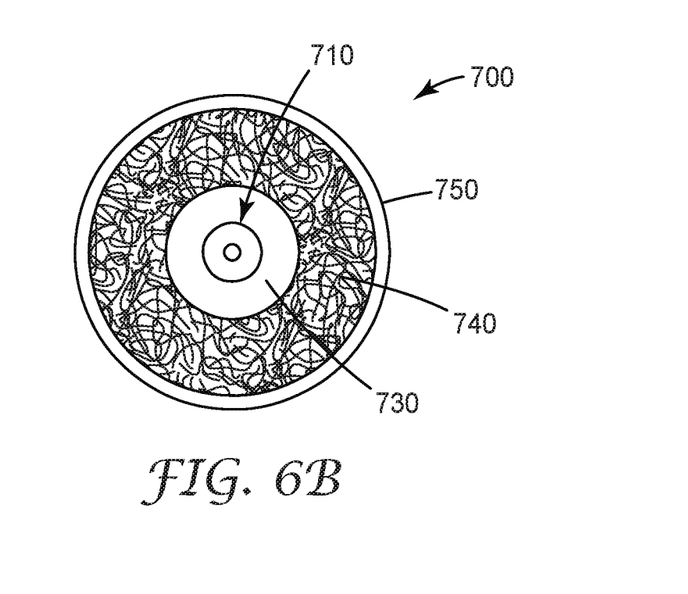

FIGS. 6A and 6B show another exemplary embodiment of a transmission cable 700 in accordance with the present disclosure. Transmission cable 700 is similar to transmission cable, except that it includes a skin layer formed over the porous layer. Thus, transmission cable 700 includes at least one signal conductor 710 centrally disposed in the cable and a plurality of concentric layers 720 disposed around the at least one signal conductor. The plurality of concentric layers comprises at least one non-porous layer 730, a porous exterior layer 740 surrounding the at least one non-porous layer, and an elastic skin layer 750 disposed over the porous layer.

Skin layer can be a thin smooth elastic film layer formed over the porous layer 740 to facilitate handling during installation. The skin layer can have a low friction surface which can facilitate pulling the exemplary cable through a duct or conduit. In an alternative aspect, the skin layer can be an elastomeric adhesive layer, such as a pressure sensitive adhesive layer, to aid in securing the cable in its installation location. The skin layer 750 can be a continuous layer or a discontinuous layer.

Figure 7:
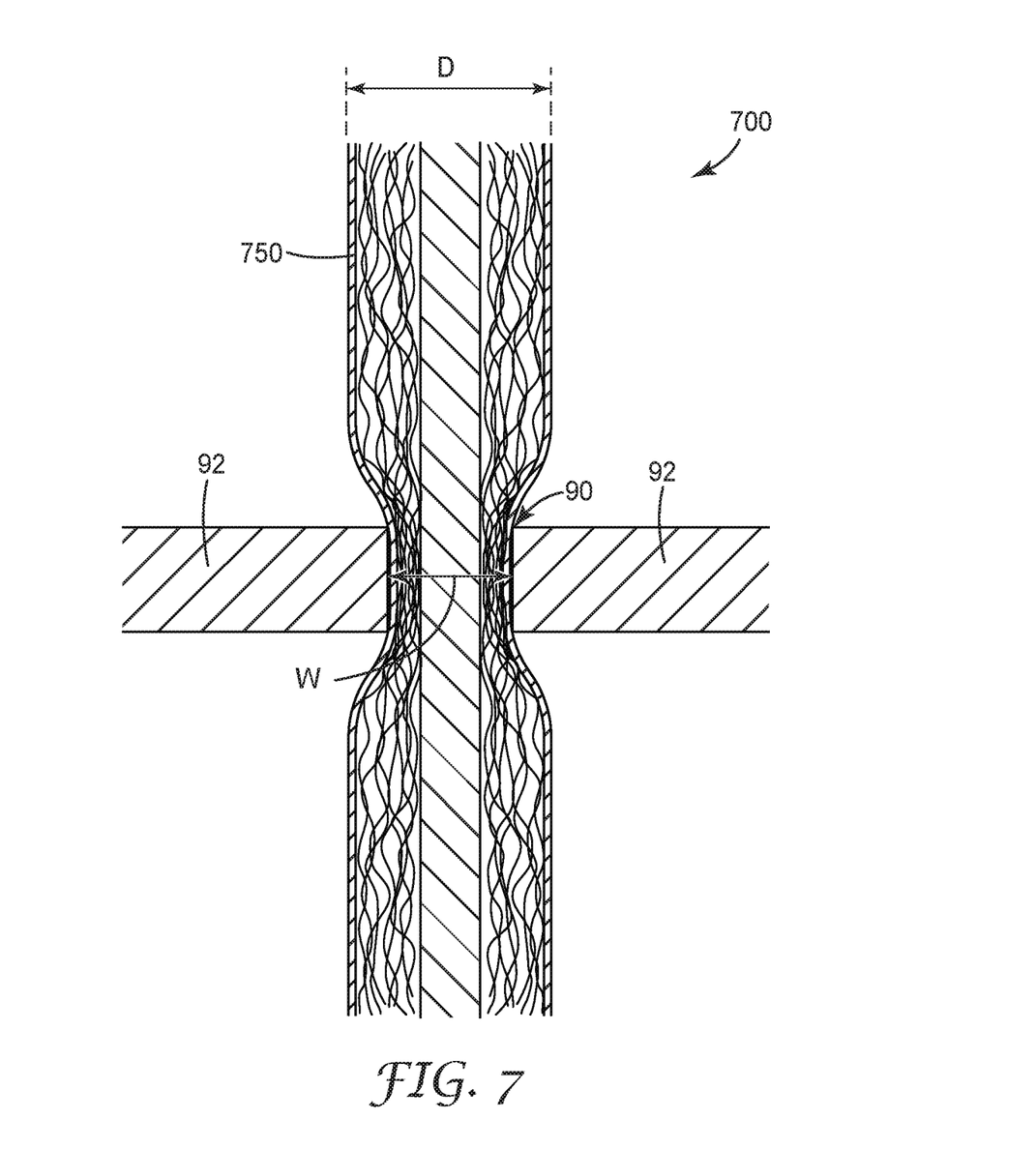
FIG. 7 illustrates another exemplary use of the signal transmission cables according to the current invention.

FIG. 7 is a schematic diagram showing transmission cable 700 disposed in a channel 90 between two structural members 92. For example, the channel can be formed by cutting a slot in a framing stud in a house creating what could be a pinch point for a traditional cable. Because of the exemplary cables of the present disclosure can be compressed to fit into gaps that are smaller than the characteristic diameter of the cable, the cable can be routed through such gaps without causing any degradation to the signal being carried by the cable. The skin layer 750 of cable 700 can stretch to accommodate any change in the cable size needed to fit into gaps or channels that are smaller than the characteristic diameter of the cable.

Various modifications, equivalent processes, as well as numerous structures to which the present invention may be applicable will be readily apparent to those of skill in the art to which the present invention is directed upon review of the present specification.

We claim:

1. A signal transmission cable having a characteristic diameter, comprising:
at least one signal conductor centrally disposed in the cable and a plurality of concentric layers disposed around the at least one signal conductor, wherein the plurality of concentric layers comprises at least one non-porous layer and a porous exterior layer surrounding the at least one non-porous layer, wherein the porous exterior layer is the outermost layer of the cable and comprised of a nonwoven material having a fibrous portion.

2. The cable of claim 1, wherein the porous exterior layer has a basis weight from about 100 g/m$^2$ to about 100 g/m$^2$.

3. The cable of claim 1, wherein the nonwoven material includes bound particles having a hardness that is greater than a hardness of the fibrous portion of the nonwoven material.

4. The cable of claim 1, wherein the nonwoven material is derived from a melt blown polymer or processed staple fiber that is mechanically or thermally bonded or a combination thereof.

5. The cable of claim 1, wherein the porous exterior layer is resiliently compressible allowing the cable to be inserted into spaces that are smaller than the characteristic diameter of the cable.

6. The cable of claim 1, wherein the porous exterior layer is characterized by a porous layer thickness.

7. The cable of claim 6, wherein a characteristic diameter of the cable can be reduced by up to 90% of two times the porous layer thickness.

8. The cable of claim 1, wherein the at least one non-porous layer comprises a polymeric sleeve.

9. The cable of claim 1, further comprising at least one strength element disposed between the at least one signal conductor and the at least one non-porous layer.

10. The cable of claim 1, wherein the at least at least one non-porous layer includes a first nonporous layer surrounding the at least one signal conductor and a second nonporous layer surrounding the first nonporous layer.

11. The cable of claim 10, wherein first nonporous layer is a buffer tube.

12. The cable of claim 10, comprising at least one strength element disposed between the first nonporous layer and the second nonporous jacket layer.

13. The cable of claim 9, wherein the at least one strength element is a strength imparting layer of an aramid floss.

14. The cable of claim 9, wherein the at least one strength element is one of an aramid yarn, a metal wire, a glass fiber reinforced polymer rod, and an aramid fiber reinforced polymer rod.

15. The cable of claim 1, wherein the signal conductor is an optical fiber.

16. The cable of claim 1, further comprising an elastic skin disposed over and around the exterior porous layer.

17. The cable of claim 1, further comprising a sealant material diffused through the porous exterior layer.

18. A method of using the transmission cable of claim 1, the method comprising:
   providing an installation location having a channel with a width that is less than a characteristic width of the cable;
   applying a pressure to an external surface of the cable to compress the porous exterior layer; and
   inserting the cable into the channel in the installation space.

19. The method of claim 18, further comprising dispensing a sealant material into the channel, wherein the sealant material is capable of diffusing into the porous exterior layer and around the cable to fill the channel.

20. The method of either claim 18, further comprising applying a protective cover over the channel.

\* \* \* \* \*

UNITED STATES PATENT AND TRADEMARK OFFICE
CERTIFICATE OF CORRECTION

PATENT NO. : 11,009,669 B2  
APPLICATION NO. : 16/713453  
DATED : May 18, 2021  
INVENTOR(S) : Cary Alan Kipke et al.

Page 1 of 1

It is certified that error appears in the above-identified patent and that said Letters Patent is hereby corrected as shown below:

In the Claims

In Column 8, Line 47, Claim 10, delete "at least at least" and insert -- at least --, therefor.

In Column 9, Line 14, Claim 20, after "method of" delete "either".

Signed and Sealed this  
Twentieth Day of July, 2021

Drew Hirshfeld  
*Performing the Functions and Duties of the*  
*Under Secretary of Commerce for Intellectual Property and*  
*Director of the United States Patent and Trademark Office*